United States Patent [19]

Kanno et al.

[11] Patent Number: 5,387,964
[45] Date of Patent: Feb. 7, 1995

[54] DEVELOPING APPARATUS INCLUDING A PARTITION BETWEEN A DEVELOPING ROLL AND A STIRRING MEMBER

[75] Inventors: Makoto Kanno; Yoshio Shiina; Akihiko Kato; Toru Isosu, all of Kanagawa, Japan

[73] Assignee: Fuji Xerox Co., Ltd., Tokyo, Japan

[21] Appl. No.: 670,194

[22] Filed: Mar. 15, 1991

[30] Foreign Application Priority Data

Mar. 19, 1990 [JP] Japan .................................. 2-69243

[51] Int. Cl.6 ............................................. G03G 15/09
[52] U.S. Cl. ..................................... 355/251; 118/653; 355/253
[58] Field of Search ............... 355/245, 246, 251, 253, 355/260; 118/657, 653, 658, 656; 222/DIG. 1

[56] References Cited

U.S. PATENT DOCUMENTS

| | | | |
|---|---|---|---|
| 4,989,539 | 2/1991 | Ichikawa | 118/658 |
| 4,993,829 | 2/1991 | Naganuma et al. | 355/251 |
| 5,003,917 | 4/1991 | Toyoshi et al. | 118/653 |

*Primary Examiner*—A. T. Grimley
*Assistant Examiner*—Thu A. Dang
*Attorney, Agent, or Firm*—Finnegan, Henderson, Farabow, Garrett & Dunner

[57] ABSTRACT

A developing apparatus having: a developing roll for carrying a developing agent, a stirring chamber for feeding the developing agent, and a partition board arranged upright therebetween along the length of the developing roll within a space which the magnetic force of the developing roll can reach. Accordingly, the charged amounts of the developing agent can be kept substantially uniform within the developing apparatus to allow recorded images whose densities are uniform and satisfactory to be obtained.

6 Claims, 6 Drawing Sheets

DEVELOPING APPARATUS INCLUDING A PARTITION BETWEEN A DEVELOPING ROLL AND A STIRRING MEMBER

BACKGROUND OF THE INVENTION

1. Field of the Invention

The invention relates to developing apparatuses which develop latent electrostatic images for various recording apparatuses such as xerographic copying machines and laser printers. More particularly, it is directed to a developing apparatus which develops latent electrostatic images using a developing agent consisting of a single magnetic component.

2. Related Art

FIGS. 8 and 9 show a developing apparatus of such type as using a single-component developing agent consisting solely of magnetic toner. Specifically, such a developing apparatus includes: a plurality of magnets fixed within a rotatable cylindrical sleeve; a developing agent carrying body b which rotates while attracting a developing agent, or toner T, on the sleeve (hereinafter referred to as "developing roll"); a blade c which forms the toner T into a thin layer by being in pressure contact with the developing roll b, and frictionally charges the toner T; a toner stirring chamber e disposed along the length of the developing roll b (hereinafter referred to as "stirring chamber"); and a toner delivering/feeding member f disposed in parallel to the developing roll b within the stirring chamber e.

In the developing apparatus thus constructed., the toner T is delivered from the stirring chamber e to a developing region facing a latent electrostatic image carrying body d by being attracted by the developing roll b so that a latent electrostatic image will be developed into a permanent image. Part of the toner T which has not contributed to the development is delivered back into the developing apparatus in association with rotation of the developing roll b, separated from the developing roll b, and returned to the stirring chamber e.

The developing apparatus thus constructed replenishes the toner T to the stirring chamber e as shown in FIG. 9. That is, after being dropped into an end of the stirring chamber e from a toner box a located at an upper position of the developing apparatus, the toner T is delivered to the other end of the stirring chamber e by the toner delivering/feeding member f and uniformly distributed over the stirring chamber e.

In delivering the toner from one end to the other of the stirring chamber, the toner is distributed uniformly over the stirring chamber by repeating the development cycle described above. In other words, the toner delivered to the stirring chamber advances toward the opposite end of the stirring chamber while moving from the stirring chamber to the developing region and back to the stirring chamber.

However, such an arrangement results in the following inconveniences. Since the toner is rubbed on the blade many times as it advances along the stirring chamber, part of the toner which is at the back in the toner delivery direction is excessively loaded compared with the toner which is in the front, and this causes an additive (such as silica) which is externally added to the toner to adjust charging amounts is blended into the toner or separated from the toner. As a result, the excessively loaded toner is deposited heavily at the back of the stirring chamber, charging such toner less intensely than that in the front. This causes the problem of reducing the densities in part of a recording image developed with such toner.

It should be noted that this problem is not unique to developing apparatuses of such type that toner is pressed and subjected to frictional charging using a blade. For example, as shown in FIG. 10, even in a developing apparatus of such type that toner T which has been frictionally charged by stirring is formed into a layer of a predetermined thickness by a noncontact type trimming member g, the toner T is likewise loaded at stirring or at toner layer forming, thereby suffering from the same problem.

SUMMARY OF THE INVENTION

The invention has been made in view of the above circumstances. Accordingly, an object of the invention is to provide a developing apparatus capable of developing a satisfactory recording image free from density impairment by reducing loads applied to the toner.

To achieve the above object, the invention is applied to a developing apparatus which comprises: a developing agent carrying body for delivering a developing agent to a developing region confronting a latent electrostatic image carrying body by attracting the developing agent by a magnetic force; and means for feeding the developing agent to the developing agent carrying body while delivering the developing agent along the length of the developing agent carrying body. In such a developing apparatus, a partition board is arranged upright along the length of the developing agent carrying body between the developing agent carrying body and the developing agent delivering/feeding means within a space which the magnetic force can reach.

In such technical means, the developing agent carrying body may, of course, be modified where appropriate, e.g., the arrangement of the magnetic poles for generating a magnetic force may be modified so long as the developing agent carrying body delivers the developing agent to the latent electrostatic image carrying body by attracting it with a magnetic force, maintaining such attraction, and separating the developing agent therefrom.

The developing agent delivering/feeding means may, of course, also be modified where appropriate, e.g., the arrangement of the number of rotating delivery members, single or plural, may be modified so long as the developing agent delivering/feeding means delivers the developing agent into the developing apparatus from without, delivers it along the length of the developing agent carrying body, and feeds it to the developing agent carrying body.

The partition board may, of course, be modified where appropriate, e.g., in its location and height, so long as the partition board is arranged upright along the length of the developing agent carrying body between the developing agent carrying body and the developing agent delivering/feeding means within a space which the magnetic force can reach, and so long as it regulates the flow of the developing agent from the delivering/feeding means to the developing agent carrying body. However, with respect to the ability of the apparatus to feed the developing agent from the developing agent delivering/feeding means to the developing agent carrying body, the location and height of the partition board must be determined in consideration of two points: (1) the location and magnetic force of not only a pair of repulsing magnetic poles for separating the developing agent from the developing agent carrying body but also the attracting magnetic pole, which is arranged adjacent to the repulsing magnetic poles, for attracting the developing agent to the developing agent carrying body; and (2) the level to which the developing agent is deposited in the developing agent delivering/feeding means. These points will be described in detail later with reference to embodiments of the invention.

The upright arrangement of the partition board between the developing agent delivering/feeding means and the developing agent carrying body serves to regulate flow of the developing agent therebetween, thereby allowing the developing agent to be distributed over the developing apparatus by the developing agent delivering/feeding means without being excessively loaded and hence allowing the developing agent to be substantially uniformly charged.

The optimization of the location and height of the partition board in relation to the magnetic force of the developing agent carrying body allows smooth feeding of the developing agent from the developing agent delivering/feeding means to the developing agent carrying body.

BRIEF DESCRIPTION OF THE DRAWINGS

FIG. 7 (B) is a graph showing correlations between the number of prints and the image density;

DETAILED DESCRIPTION OF THE PREFERRED EMBODIMENTS

A developing apparatus of the invention will be described in detail with reference to the accompanying drawings.

Figure 1:
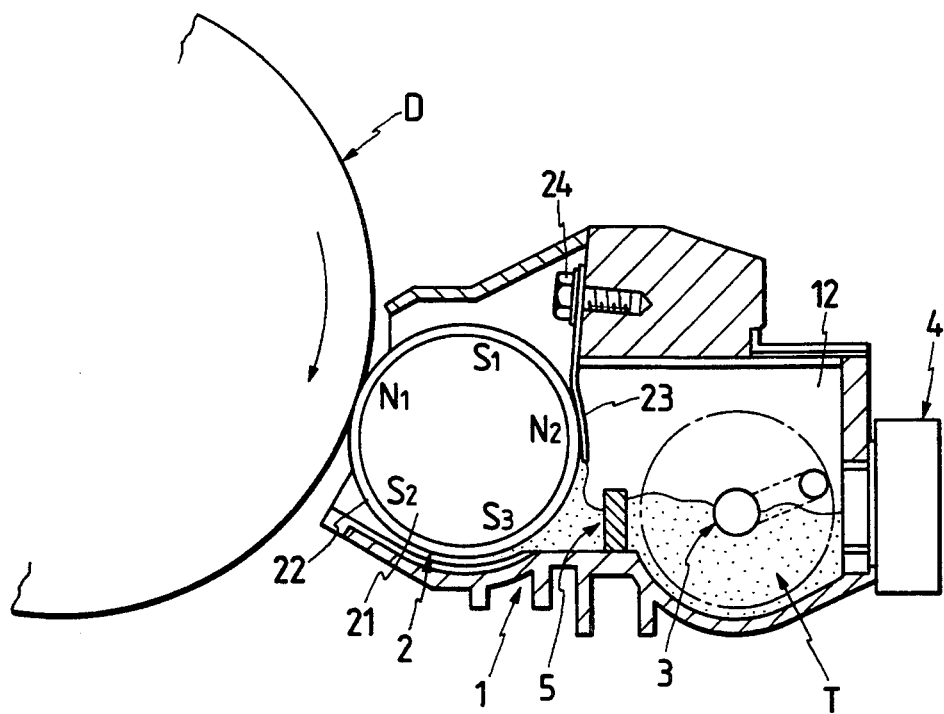
FIG. 1 is a schematic sectional view showing a developing apparatus, which is an embodiment of the invention.
Figure 2:
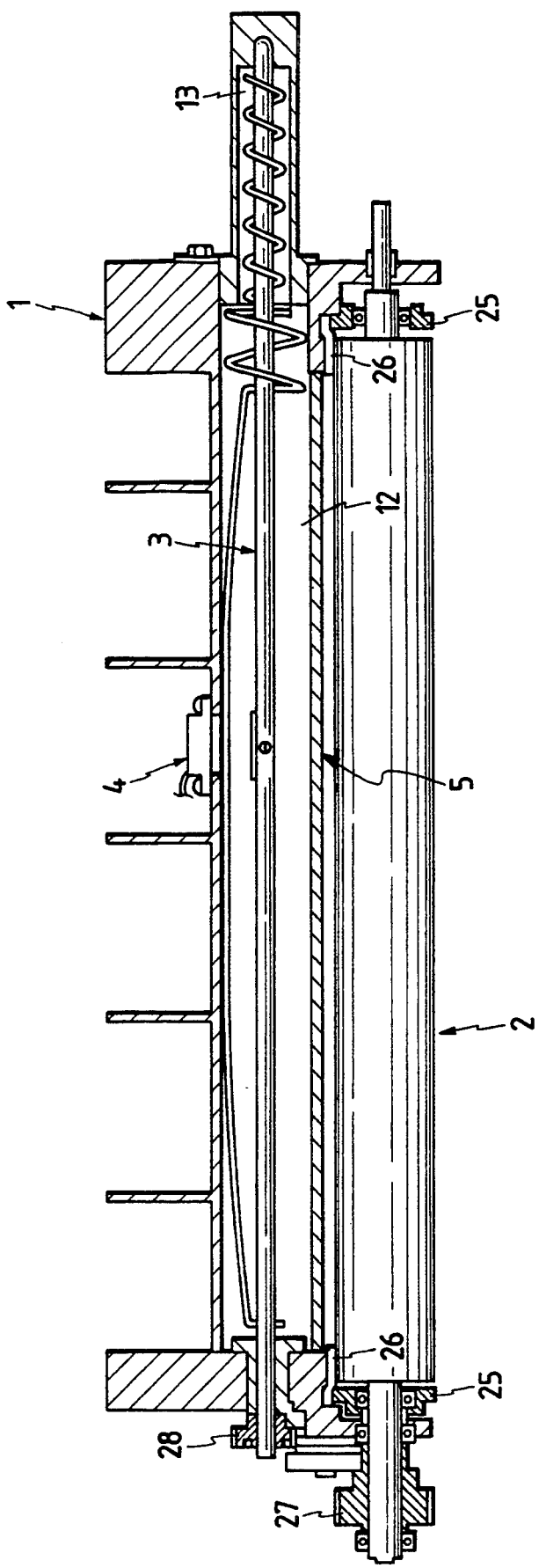
FIG. 2 is a sectional elevation of the embodiment.

As shown in FIGS. 1 and 2, the developing apparatus, which is an embodiment of the invention, includes: a developing roll 2 (developing agent carrying body) which is disposed on one end of a housing 1 and part of its outer surface is exposed to the outside of the housing 1; toner delivering/feeding means 3 (hereinafter referred to as "delivering/feeding means") which delivers single-component magnetic toner T into a toner stirring chamber 12 arranged within the housing 1; and a partition board 5 which stands up between the developing roll 2 and the delivering/feeding means 3.

The developing roll 2 is formed by covering a firmly supported, substantially cylindrical magnet member 21 with a cylindrical sleeve 22 in such a manner that the sleeve 22 can rotate around the outer surface of the magnet member 21. The magnet member 22 is provided with a developing pole $N_1$, a delivering pole $S_1$, an attracting pole $N_2$, repulsing poles $S_2$, $S_3$ by a magnetization method. The magnetic toner T within the toner stirring chamber 12 is attracted to the outer surface of the sleeve 22 by the magnetic force of the attracting pole $N_2$ so that the magnetic toner T is delivered to a developing region facing a latent electrostatic image carrying body D, while the magnetic toner T is separated from the sleeve 22 by a repulsing magnetic field formed by the repulsing poles $S_2$, $S_3$ and then attracted to the sleeve 22 again by the magnetic force of the repulsing pole $S_3$. On the outer surface of the sleeve 22 is a blade 23 provided in pressure contact therewith to thinly deposit the attracted magnetic toner T thereon. This blade 23 is secured to the upper portion of the housing 1 by a bolt 24. In FIG. 2, reference numeral 25 designates a tracking roll, disposed on the developing roll 2 coaxially through a bearing to keep a gap between the developing roll 2 and the latent electrostatic carrying body D; 26, a seal member for sealing between the housing 1 and the developing roll 2 to prevent toner leakage from the housing 1.

The toner delivering/feeding means 3 is a bar-like member which rotates while passing through a toner delivery path 13 which protrudes from the stirring chamber 12 and the housing 1 and communicates with the stirring chamber 12. The toner delivering/feeding means 3 serves not only to deliver the toner T dropped into the toner delivery path 13 from a toner box (not shown) located in an upper portion of the developing apparatus into the stirring chamber 12 but also to feed the toner T from the stirring chamber 12 to the developing roll 2.

One end of the developing roll 2 and an end of the toner delivering/feeding means 3 in the axial directions thereof are engaged with gears 27, 28 and are connected to a drive motor (not shown) so as to rotate a predetermined number of revolutions.

In addition, on one side of the stirring chamber 12 is arranged a toner level sensor 4. This sensor 4 serves to detect the deposition level of the toner T in the stirring chamber 12, i.e., the remaining quantity of toner in the stirring chamber 12. The toner T is fed from the toner box into the delivery path 13 based on this detection signal.

The partition board 5 is arranged upright so as to provide a partition between the stirring chamber 12 and the developing roll 2 along the length of the developing roll 2 and so as to allow the magnetic force of the attracting pole $N_2$ of the developing roll 2 to reach the apex of the partition board 5.

The magnetic force must reach the apex of the partition board 5 to ensure that the toner T which rises in the vicinity of the partition board 5 or the toner T climbs over the partition board 5 due to the rotation of the delivering/feeding means 3, can be attracted by the developing roll 2. If the magnetic force cannot reach the apex of the partition board 5, the toner T which climbs over the partition board 5 cannot be sufficiently attracted by the developing roll 2, nor is it possible to attract the toner T from the stirring chamber 12 side, thereby causing the ability of toner to be fed to the developing roll 2 to be impaired drastically. To attract the toner T efficiently, it is not enough to have the magnetic force reach the apex. Thus, to ensure the toner T feedability so that a developed image has sufficient densities, it is assumed that a certain amount of magnetic force must reach the apex of the partition board 5. Thus, the location and height of the partition board 5 has a great bearing on not only the location of the magnetic poles of the developing roll 2 but also the distance from the developing roll 2 from the viewpoint of ensuring the toner feedability.

The partition board 5 regulates the passage of the toner T between the developing roll 2 and the stirring chamber 12. Therefore, if its height is excessively lower than the deposition level of the toner T in the stirring chamber 12 (hereinafter referred to as "toner level"), the object of the invention cannot be achieved, while if it is too high, it is assumed that the attraction of the toner T to the developing roll 2 is disturbed. Thus, it can be said from these assumptions that the best partition board height has an intimate correlation with the toner level in the stirring chamber 12.

The results of experiments conducted by the inventors of the invention to determine the location and height of the partition board 5 are reported below, together with a review of such results.

Experiment 1

Figure 3:
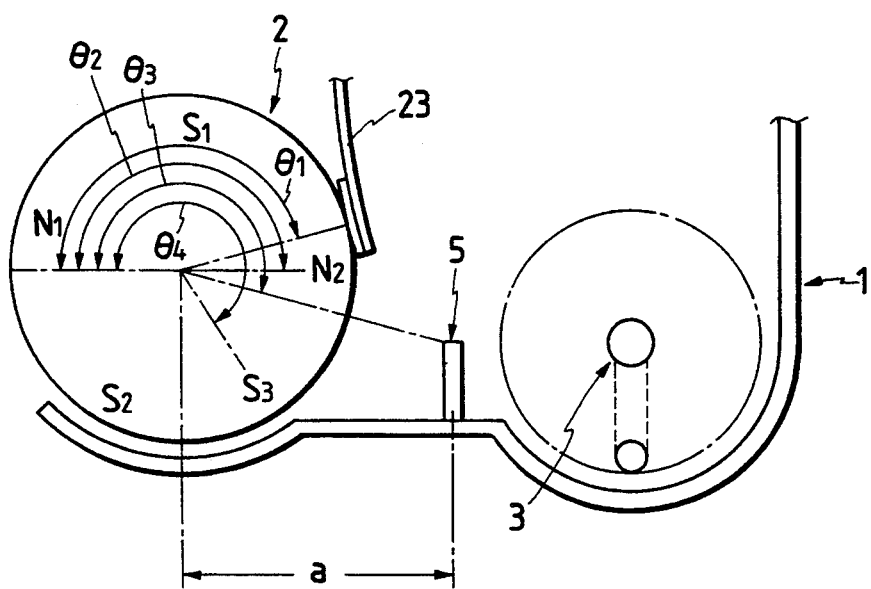
FIG. 3 is a schematic diagram for a description of experiments 1 and 3 conducted for the embodiment.

Correlations between the location of the magnetic poles in the developing roll 2 and the location of the apex of the partition board 5 were examined in this experiment. As shown in FIG. 3, the feedability of the toner T from the stirring chamber 12 to the developing roll 2 was evaluated by assuming that the angle between the horizontally of the developing roll 2 and the position at which the blade 23 is in pressure contact with the developing roll 2 is $\theta_1$ (=170°); similarly, that the angle formed with the attracting pole $N_2$ is $\theta_2$; that the angle formed with the apex of the partition board 5 is $\theta_3$ (=200°); and that the angle formed with the repulsing pole $S_3$ is $\theta_4$, and changing the angles $\theta_2$ and $\theta_4$. The result is as shown in Table 1 below.

TABLE 1

| $\theta_4$ \ $\theta_2$ | 95° | 170° | 175° | 180° | 210° |
|---|---|---|---|---|---|
| 185° | X | X | X | — | — |
| 200° | X | Δ | Δ | Δ | — |
| 260° | Δ | Δ | O | O | X |
| 280° | Δ | Δ | O | O | X |

Note:
O: excellent, Δ: acceptable, X: not acceptable

From the above result, it is demonstrated that the feedability is not satisfactory if the angle $\theta_2$ formed with the attracting pole $N_2$ is smaller than the angle $\theta_1$ formed with the pressure contact position of the blade 23 or larger than the angle $\theta_3$ formed with the apex of the partition board 5. The reason is assumed to be that the attracting pole, being hidden under the blade 23 or the partition board 5, does not cause its magnetic force to act upon the toner T on the stirring chamber 12 side sufficiently. It is also demonstrated that the feedability is not satisfactory if the angle $\theta_4$ formed with the repulsing pole $S_3$ is smaller than the angle $\theta_3$ formed with the apex of the partition board 5. The reason is assumed to be that a repulsive magnetic field formed by the repulsing poles $S_2$, $S_3$ reaches the apex of the partition board 5 and thus finds it difficult to attract again the developing agent once separated from the developing roll 2. Therefore, if such correlations are expressed in terms of height in the horizontal direction, it can be said that the toner feedability is satisfactory as long as the apex of the partition board 5 is lower than the attracting pole $N_2$ and higher than the repulsing pole $S_3$.

Experiment 2

Figure 4:
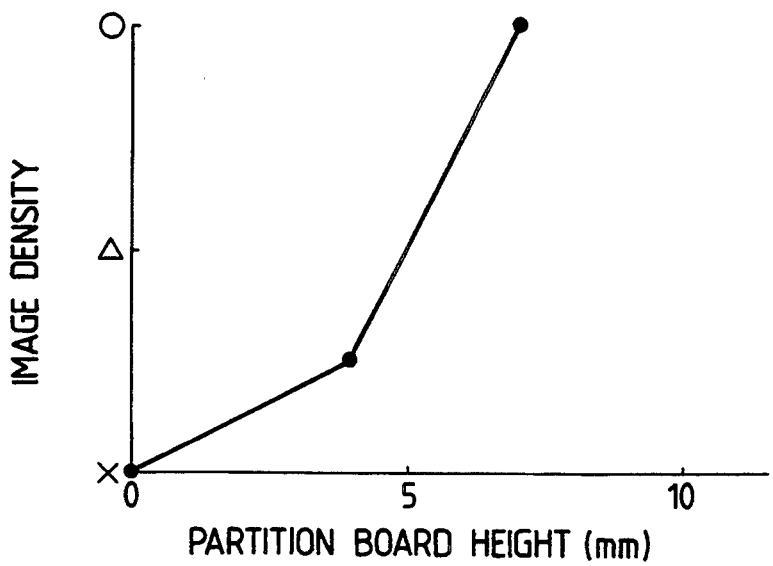
FIG. 4 is a graph showing the result of experiment 2.

Correlations between the toner level in the stirring chamber 12 and the height of the apex of the partition board 5 were examined in this experiment. In the developing apparatus used in the experiment, the image densities of the portions which are on the back side in the toner feed direction were evaluated under the following three conditions: that no partition board 5 is provided; and that the partition board 5 is 4 mm and 7 mm in height. In each condition, the toner level is maintained at a height of 5.5 mm from the upright surface of the partition board 5. The result is as shown in FIG. 4. From the result, it is found not advantageous if the partition board 5, though arranged upright, is lower than the toner level, while the densities of recorded images are satisfactory if the partition board 5 is slightly higher than the toner level. Thus, it is preferable that the partition board 5 is higher than the toner level in the stirring chamber 12.

Experiment 3

Correlations between the intensity of a magnetic force on the apex of the partition board 5 and the toner feedability were examined in this experiment. In the experiment, the feedability of the toner T from the stirring chamber 12 to the developing roll 2 was evaluated under such magnetic intensities of the attracting pole $N_2$ as 300G and 700G while changing the distance a from the center of the developing roll 2 to the position where the partition board 5 is arranged upright (FIG. 3). The experiment was conducted with the height of the partition board 5 being 7 mm, the toner level in the stirring chamber 12 being 5.5 mm, and the radius of the developing roll 2 being 15 mm. The result is as shown in Table 2.

TABLE 2

| $N_2$ \ a | 15 mm | 18 mm | 21 mm | 25 mm |
|---|---|---|---|---|
| 300G | X | Δ | Δ | X |
| 700G | X | Δ | O | X |

Figure 5:
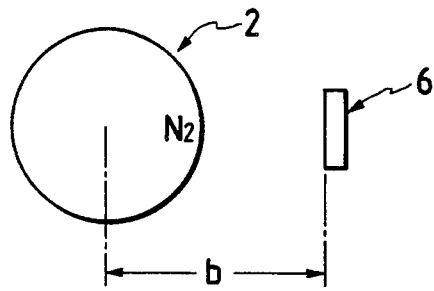
FIG. 5 is a schematic diagram for a description of a method of measuring the magnetic force of an attracting pole.

Independently of the above experiment, magnetic intensities were measured under 730G, 550G, and 300G by changing the distance from the attracting magnetic pole. To measure the magnetic intensities, a magnetic force measuring probe 6 was employed at a distance b from the center of the developing roll 2 as shown in FIG. 5. The result is as shown in FIG. 6.

From the results of these experiments, it is demonstrated that the toner feedability is impaired drastically when the toner is away from the developing roll 2 by a distance larger than a certain value; and that the larger the magnetic force of a magnetic pole is, the more satisfactory the ability to feed becomes. On the other hand, from the result of the magnetic force measurement, it is exhibited that the magnetic force reaches the partition board 5 in each case as long as the distance is a.

Hence, it is understood that, to feed the toner T from the stirring chamber 12 to the developing roll 2, the partition board 5 must be arranged upright within the space which the magnetic force can reach and, at the same time, that to ensure proper feedability, a magnetic force of a certain magnitude must reach the partition board 5.

Figure 6:
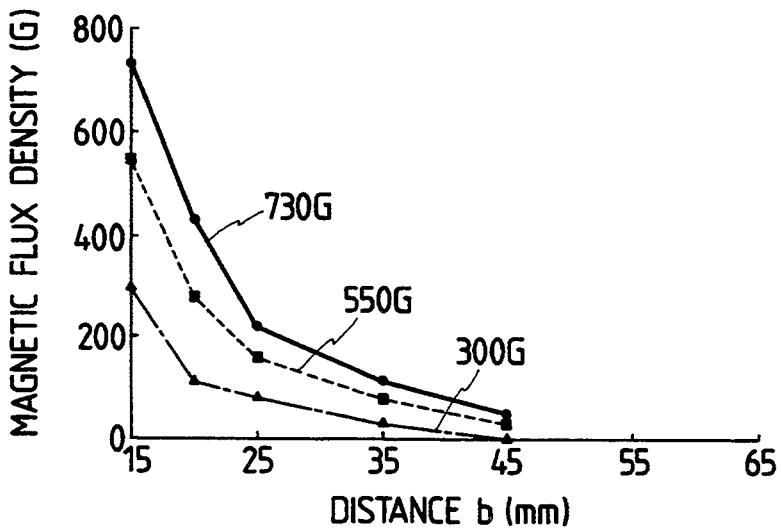
FIG. 6 is a graph showing correlations between the distance from the center of a developing roll and the intensity of a magnetic force.

From the result shown in FIG. 6, it is when the distance b is about 15 mm or more with the magnetic pole of 300G and when the distance b is about 25 mm or more with the magnetic pole of 730G that the magnetic force becomes 200G or less. These distances coincide with the demarcation between satisfactory and unsatisfactory feedabilities observed in the result shown in Table 2. Thus, the inventors assume that the magnitude of a magnetic force reaching the partition board 5 must be 200G or more to ensure proper toner feedability.

The reason why the magnetic pole having intensities of 300G and 700G is poor in feedability with the distance a being 15 mm is assumed to be that the upright arrangement of the partition board 5 very near the developing roll 2 does not provide a sufficient space between both members.

Thus, according to the developing apparatus of the invention, in which the partition board 5 is provided between the developing roll 2 and the stirring chamber 12, the toner T is delivered from the delivery path 13 side to the opposite side only by the flow within the stirring chamber 12, thereby being subjected to no excessive load. As a result, the charged amounts of the toner T in the stirring chamber 12 can be kept substantially uniform.

In addition, proper delivery of the toner T to the developing roll 2 can be ensured using the partition board 5 if the location and height of the partition board 5 is optimized as described above.

To verify the advantage of the embodiment, measurements of the charged amounts of the toner T and the image density are reported below.

Figure 7A:
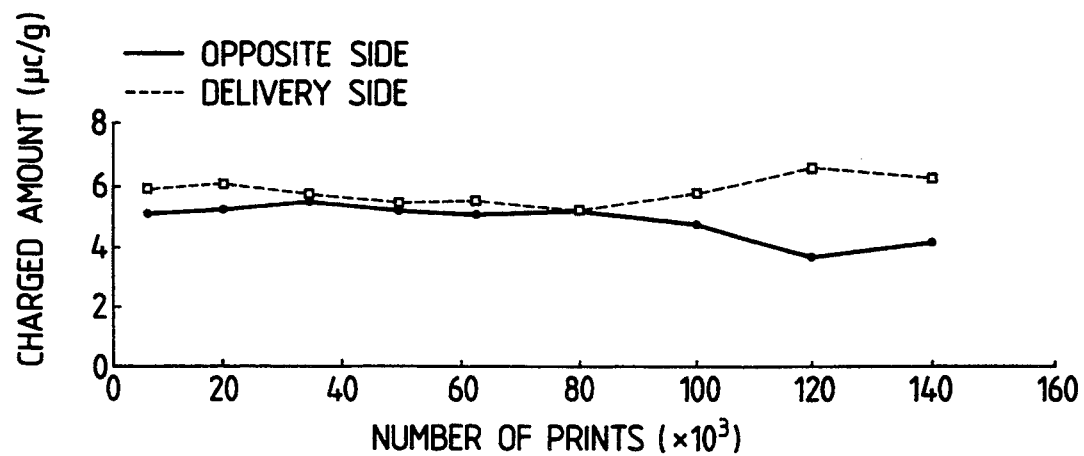
FIG. 7 (A) is a graph showing correlations between the number of prints and the charged amount of toner in the embodiment.
Figure 7B:
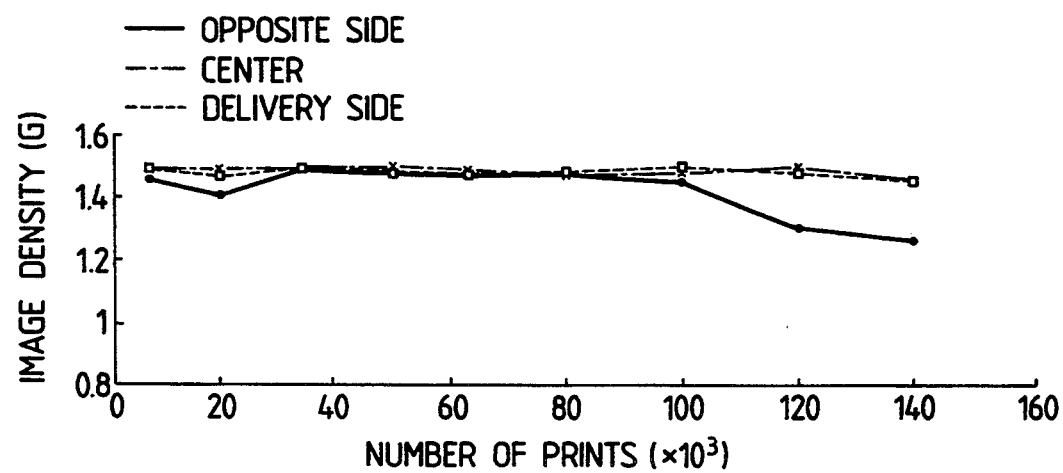
Figure 8:
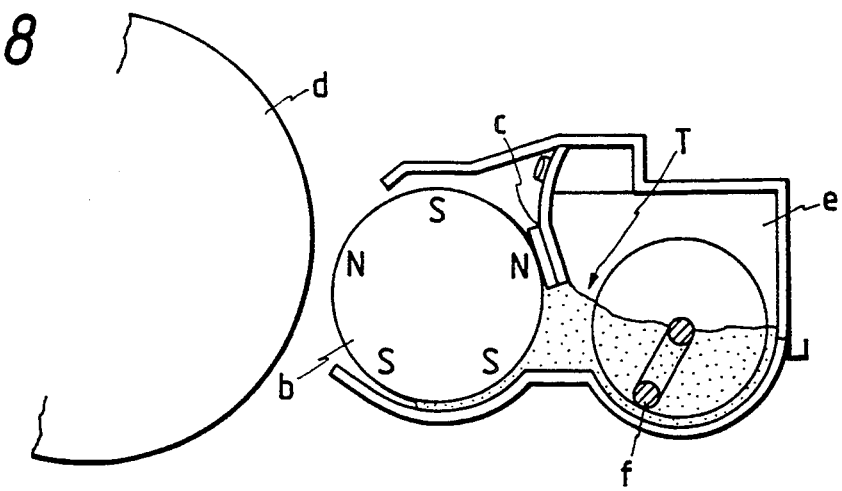
FIGS. 8 and 9 are a sectional elevation and a side sectional view showing a developing apparatus using a single-component developing agent, which is the related art of the present invention.
Figure 9:
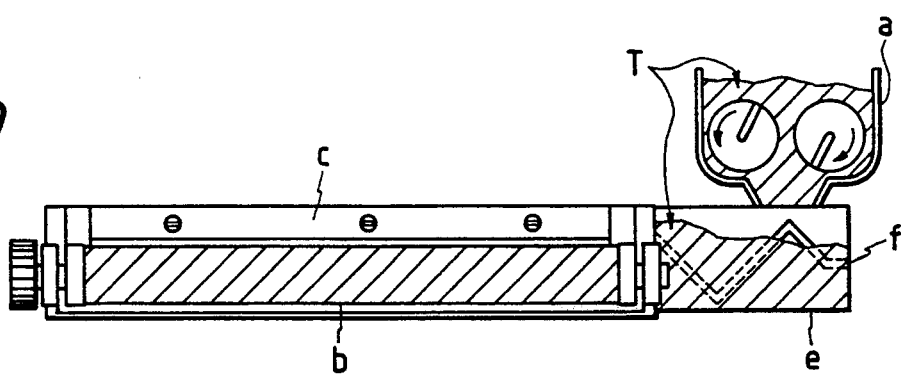
Figure 10:
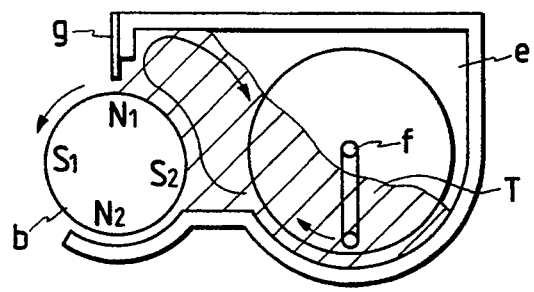
FIG. 10 is a front sectional view showing another conventional developing apparatus using a single-component developing agent, which is the prior art of the present invention.
Figure 11A:
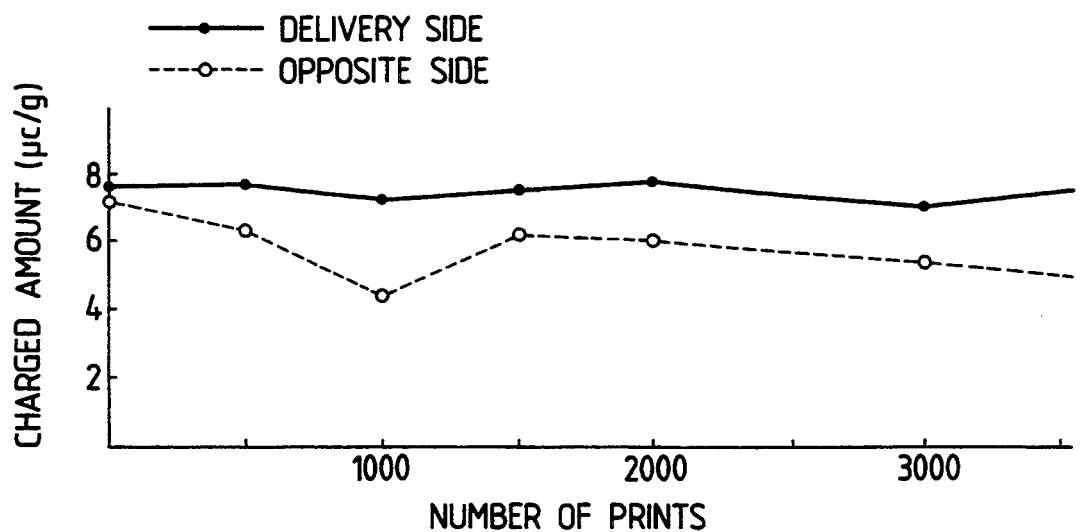
FIGS. 11 (A) and (B) are graphs showing correlations between the number of prints and the charged amount of toner/image density in a developing apparatus dispensed with a partition board of the present invention.
Figure 11B:
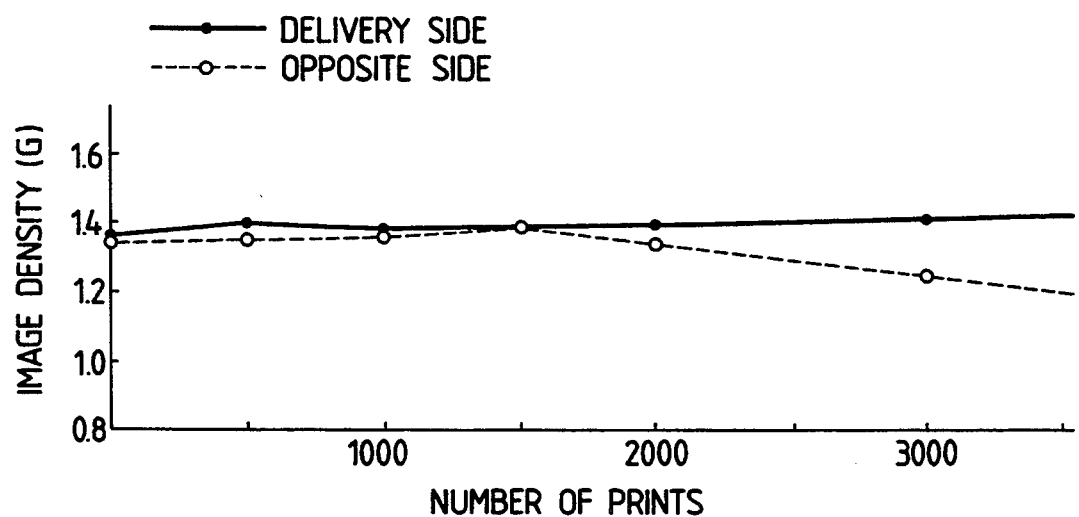

Not only the charged amounts of the toner T were measured at both the delivery path 13 side of the stirring chamber 12 and its opposite side, but also the densities of the images developed at the corresponding locations were measured, and how these values vary in function of the developing amount, i.e., the number of recorded images, was observed. FIG. 7 (A) shows the charged amounts; and FIG. 7 (B) shows the image densities. For comparison, similar measurements made on a developing apparatus with no partition board are as shown in FIGS. 11 (A) and (B).

From the results of the embodiment, both the charged amounts of the delivery path 13 side and of the opposite side exhibited values substantially close to each other up to some 100 thousands prints, with no substantial reduction in the charged amounts on the opposite side for more prints. The image densities exhibited variations substantially analogous to those of the charged amounts.

In the developing apparatus without the partition board 5, it is understood that the charged amounts on the opposite side is lower than that on the delivery path 13 side and that the charged amounts on the opposite side is on the gradual decline with 2000 or more prints. The image densities on the opposite side also decline following the decline of the charged amounts.

From the above data, it is verified that the upright arrangement of the partition board 5 achieves the object of the invention, which is to keep the image densities on both the delivery path 13 side and its opposite side uniform.

As described in the foregoing pages, according to the developing apparatus of the invention, a partition board is arranged upright between a developing agent delivering/feeding means and a developing agent carrying body to regulate the flow of the developing agent between the developing agent delivering/feeding means and the developing agent carrying body. Therefore, the charged amounts of the developing agent can be kept substantially uniform within the developing apparatus, thereby allowing recorded images whose densities are uniform and satisfactory to be obtained.

What is claimed is:

1. A developing apparatus comprising:
   a developing agent carrying body for delivering a developing agent to a developing region confronting a latent electrostatic image carrying body by attracting said developing agent by a magnetic force, said developing agent carrying body having a predetermined length;
   developing agent delivering/feeding means for feeding said developing agent to said developing agent carrying body while delivering said developing agent along the length of said developing agent carrying body; and
   a partition board arranged upright along the length of said developing agent carrying body between said developing agent carrying body and said developing agent delivering/feeding means, said partition board being positioned such that said magnetic force is strong enough to attract said developing agent over an apex of said partition board.

2. The developing apparatus according to claim 1, wherein an intensity of said magnetic force acting on said apex of said partition board is 200G or more.

3. The developing apparatus according to claim 1, wherein said partition board is further positioned such that said apex of said partition board is higher than a level to which said developing agent is deposited in said developing agent delivering/feeding means.

4. The developing apparatus according to claim 1, wherein said developing agent carrying body includes a pair of repulsing magnetic poles for separating said developing agent from said developing agent carrying body, said pair of repulsing magnetic poles being positioned on said developing agent carrying body in a position vertically lower than said apex of said partition board.

5. The developing apparatus according to claim 4, wherein said developing agent carrying body further includes an attracting magnetic pole for attracting said developing agent to said developing agent carrying body, said attracting magnetic pole being positioned on said developing agent carrying body adjacent to said pair of repulsing magnetic poles and in a position vertically higher than said apex of said partition board.

6. The developing apparatus according to claim 1, wherein said developing agent carrying body includes an attracting magnetic pole for attracting said developing agent to said developing agent carrying body, said attracting magnetic pole being positioned on said developing agent carrying body in a position vertically higher than said apex of said partition board.

* * * * *